No. 791,968. PATENTED JUNE 6, 1905.
W. A. WILEY.
MACHINE FOR RAISING AND PLANTING POLES.
APPLICATION FILED OCT. 15, 1904.
2 SHEETS—SHEET 1.
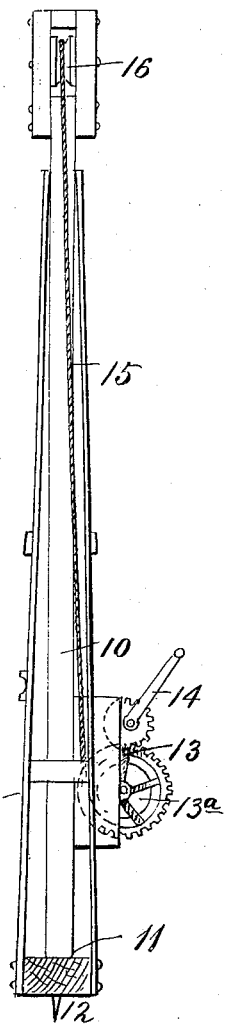
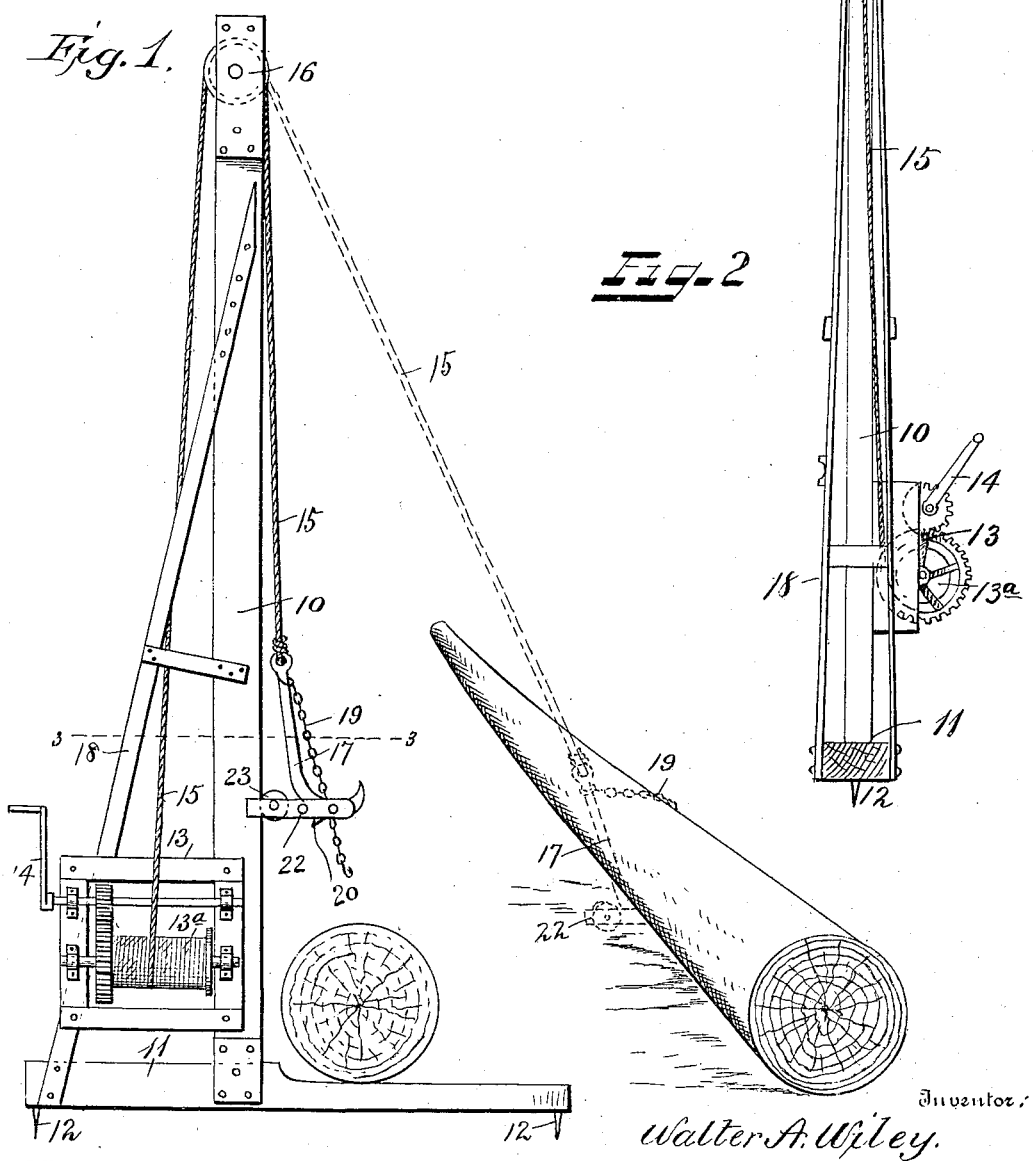

No. 791,968. PATENTED JUNE 6, 1905.
W. A. WILEY.
MACHINE FOR RAISING AND PLANTING POLES.
APPLICATION FILED OCT. 15, 1904.
2 SHEETS—SHEET 2.
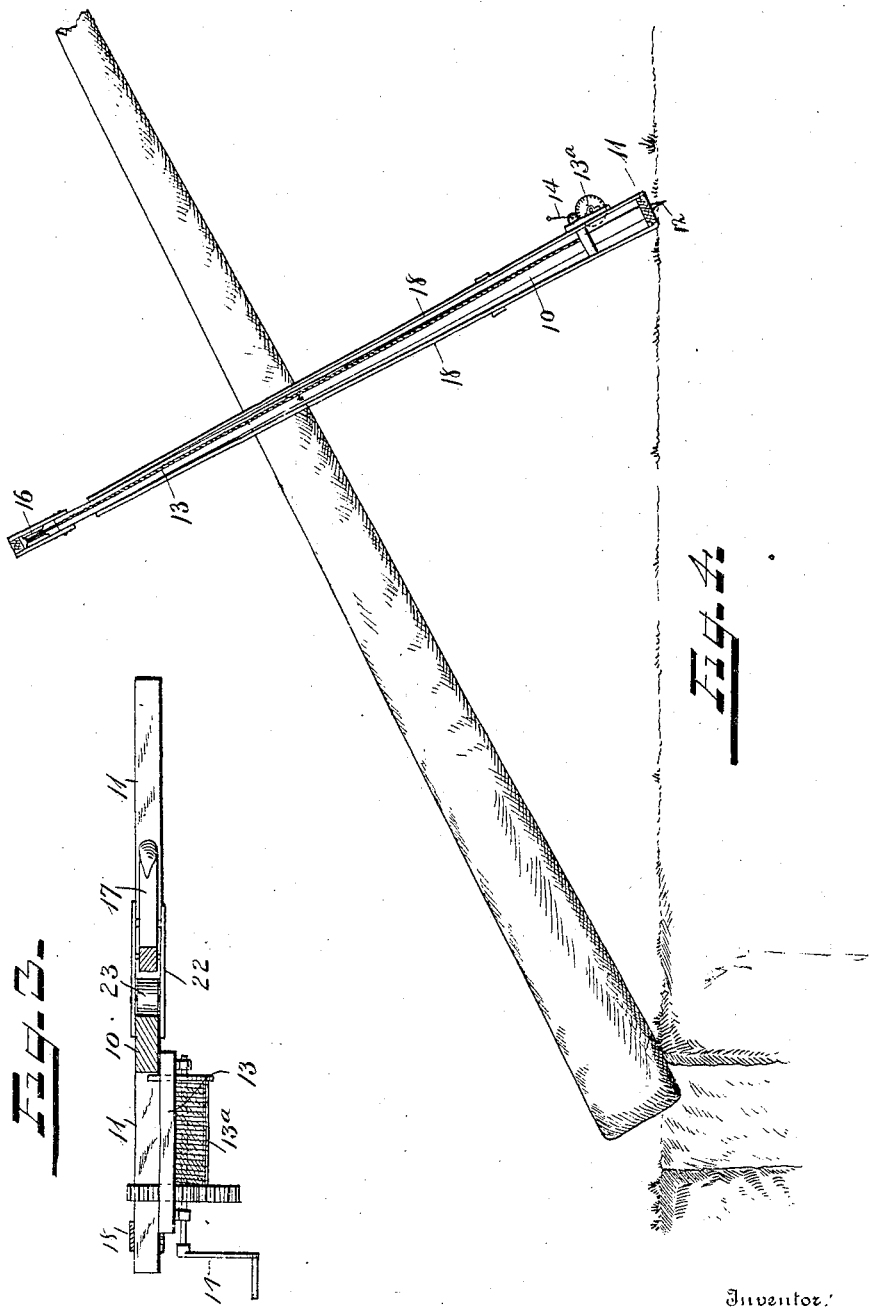

No. 791,968.

Patented June 6, 1905.

UNITED STATES PATENT OFFICE.

WALTER A. WILEY, OF SENECA, KANSAS, ASSIGNOR OF ONE-HALF TO RUFUS M. EMERY, OF SENECA, KANSAS.

MACHINE FOR RAISING AND PLANTING POLES.

SPECIFICATION forming part of Letters Patent No. 791,968, dated June 6, 1905.

Application filed October 15, 1904. Serial No. 228,639.

*To all whom it may concern:*

Be it known that I, WALTER A. WILEY, a citizen of the United States, residing at Seneca, in the county of Nemaha and State of Kansas, have invented new and useful Improvements in Machines for Raising and Planting Poles, of which the following is a specification.

This invention relates to machines for raising and planting poles of any kind and for any purpose, the object being not only to provide a machine that may do the work efficiently, but one also that may be readily portable, so that it can be easily and quickly brought into position for use in order that a great amount of work can be accomplished by it in a given time.

The invention will clearly appear from the description hereinafter given, taken in connection with the annexed drawings, forming a part of this specification, of which drawings—

Figure 1 is a side view of the improved machine complete, showing a pole in position to be engaged by the hook and raised and showing also the manner in which the hook and its attached cable may be employed to assist in dragging a pole into place to be raised. Fig. 2 is an end view of the machine. Fig. 3 is a sectional view in plan taken on the line 3 3 of Fig. 1. Fig. 4 is a view of the machine shown in the act of raising a pole.

The same symbols of reference designate the same parts or features wherever they occur.

In the drawings, 10 designates the upright of the derrick, which may be made as long and as strong as circumstances may require and which is supported at its lower end upon a scantling or other similar means 11, which is provided on its bottom with spikes 12 to keep it from slipping, and yet allow it to lean a little to one side or the other, as will presently appear.

A substantially rectangular frame 13 is connected with the base and upright and forms means in which the drum 13ª of a windlass may be journaled and operated by a crank 14 to wind up a cable 15, running from said drum to the top of the upright 10 over a pulley 16 and down again to any needed extent, and has its lower end attached to the end of the shank of a hook 17, which hook is quite large enough to engage about as large a pole as it will be likely to raise by the machine, yet the said hook need not be so large as to completely embrace the pole.

A brace 18 may extend from the rectangular frame to near the top of the upright to support and stiffen the structure, and other similar provisions may be made, if necessary.

19 designates a chain, one end of which is attached to the shank of the hook, while the free portion is adapted to be passed around the pole engaged by the hook and have one of its links engaged by the projection 20 on the lower side of the hook to keep the pole from rolling off.

22 designates arms riveted upon the hook— one on each side—and projecting from the heel, between which arms is journaled a roller 23, adapted to run on the outer face of the upright 10, the ends of the arms extending along the sides to guide it as the hook moves up and down along the side of the upright.

The hook may be made to engage a pole near the upright, as shown in Fig. 1, and by means of the windlass assist in drawing the pole in place on the scantling forming the base of the machine, which base on the side of the hook may be extended, as shown in the drawings, to form a temporary rest for the poles. The pole being in place it will be engaged by the hook and secured from rolling off the latter by the engagement of one of the links with the projection 20, when by turning the crank of the windlass the hook and pole will be drawn up by the cable until it is sufficiently high to slip or to be shot into the hole dug for it at its base.

When the pole is first attached to the derrick, the upright 10 will stand perpendicular, or practically so. As the pole is raised the upright will lean more and more toward the pole, following it, as it were, until raised to sufficient height to slip into its hole, as stated.

This following of the pole by the upright enables it to be easily controlled and does away with the need of guys and pikes, excepting when it is necessary to guide the pole to avoid limbs of trees, wires, or other obstructions.

In practice machines weighing about one hundred pounds have been found adequate to raise poles from thirty-five to fifty feet in length and weighing over a ton and but with one man to turn the crank.

I claim—

1. A pole-raising machine, consisting of a derrick and hoisting device thereon, in combination with a narrow base consisting of a scantling having spikes projecting from the bottom to engage the ground and prevent it from slipping.

2. A pole-raising machine, consisting of a derrick and a hoisting device thereon, in combination with a narrow base consisting of a scantling having spikes projecting from the bottom to engage the ground and prevent it from slipping, one end of said base being extended to form a rest for the base of the pole.

3. A pole-raising machine, consisting of an upright, a narrow base consisting of a scantling having spikes projecting from the bottom to keep it from slipping, a rectangular frame for the windlass, and a pulley at the top of the upright.

4. A pole-raising machine, consisting of an upright, a narrow base consisting of a scantling having spikes projecting from the bottom to keep it from slipping, a rectangular frame for the windlass, and a pulley at the top of the upright, said narrow base being extended at one side to form a temporary rest for the pole.

In testimony whereof I affix my signature in presence of two subscribing witnesses.

WALTER A. WILEY.

Witnesses:
R. D. McCliman,
H. R. Levict.